June 14, 1960 K. J. W. GEIGER ET AL 2,941,032

SYSTEM FOR THE TRANSMISSION OF TELEVISION SIGNALS

Filed April 1, 1957 2 Sheets-Sheet 1

INVENTOR.
KONRAD JAKOB WILHELM GEIGER
JOHANNES HENDRIK WESSELS
BY
Frank R. Jifari
AGENT INVENTOR
KONRAD JAKOB WILHELM GEIGER
JOHANNES HENDRIK WESSELS
BY
Frank R Jeifani
AGENT

United States Patent Office 2,941,032 Patented June 14, 1960

2,941,032

SYSTEM FOR THE TRANSMISSION OF TELEVISION SIGNALS

Konrad Jakob Wilhelm Geiger, Zurich, Switzerland, and Johannes Hendrik Wessels, Eindhoven, Netherlands, assignors to North American Philips Company Inc., Irvington on Hudson, N.Y.

Filed Apr. 1, 1957, Ser. No. 650,044

Claims priority, application Netherlands Apr. 18, 1956

15 Claims. (Cl. 178—6.6)

This invention relates to systems for the transmission of television signals or similar signals through one or more channels the bandwidth of which is smaller than that of the signals.

Such systems can be used when the bandwidth of the available transmission channels is smaller than the bandwidth of the signal to be transmitted. An example of a situation in which such a system may be required is the case where a television signal is to be transmitted which has a bandwidth of about 4 mc./s. and the cables or other available conductors only permit of transmitting signals having a bandwidth of about 1 mc./s.

Another example is the case where a television signal is to be recorded on a magnetic tape for later use. The transmission channel, which in this case comprises a recording head, the magnetic tape itself and a reproducing head, has a frequency range which generally is only part of the frequency range required for the transmission of the television signal.

In the known systems, the procedure is as follows: at the transmitter end, the signal is divided into a number of frequency-bands with the aid of one or more band-pass filters and, as the case may be, a low-pass filter. The width of each of these frequency bands is substantially equal to the frequency range of a transmission channel. The output signals of the band-pass filters are supplied to modulators which convert these signals into low-frequency signals. These low-frequency signals and the output signal of the low-pass filter are supplied to a corresponding number of transmission channels. At the receiver end, each of the signals transmitted, with the exception of the signal which was originally a low-frequency signal, is returned to its original frequency range.

It is an object of the present invention to carry out such a transmission with the use of a smaller number of required channels, modulators and band-pass filters than in the known systems, in order not only to reduce the costs of the system but also to improve the quality of the system.

According to the invention, a system for the transmission of television signals or similar signals through one or more channels the bandwidth of which is smaller than that of the signals is characterized in that for the transmission of a frequency band of the signal to be transmitted which band is about twice as large as the frequency range of a transmission channel, the signal components the frequencies of which lie within the said frequency band are supplied to a modulator in which the said components are caused to modulate a subcarrier the frequency of which is one fourth of an odd multiple of the frame frequency of the system and also about equal to the centre frequency of the frequency band under consideration, the output signal of this modulator being supplied to one of the said transmission channels and the output signals of this transmission channel being supplied to a modulator in which the said output signal is caused to modulate a subcarrier the frequency of which is equal to that of the first-mentioned subcarrier.

In order that the invention may readily be carried out, two embodiments thereof will now be described, by way of example, with reference to the accompanying diagrammatic drawings, in which.

Figure 1:
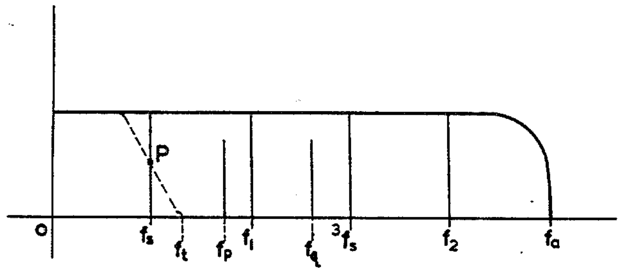
Fig. 1 is a frequency characteristics of a signal having large bandwidth and the frequency characteristic of the avaliable transmission channels.

Fig. 1 shows a frequency characteristic of a signal having a large frequency band which lies between the frequencies 0 and $f_a$; however, for the transmission of this signal there are available only channels the frequency bands of which extend between the frequencies 0 and $f_s$, $f_s$ being less than $f_a$. As an example we will take the case where $f_a=5f_s$. In order to simplify the explanation of the invention, it is provisionally assumed that the said channels have a sharp boundary at the frequency $f_s$.

Figure 2:
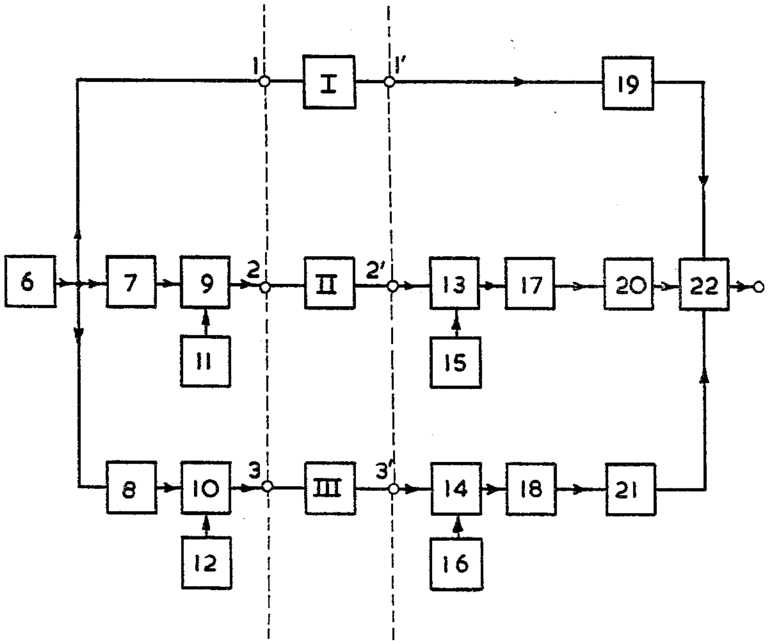
Fig. 2 shows, in block-schematic form, a transmitter and a receiver for a system in accordance with the invention and Fig. 3 also shows, in block-schematic form, an embodiment of a transmitter and a receiver for a system in accordance with the invention.

Fig. 2 shows a simplified embodiment of a transmitter and receiver together with the associated transmission channels for a system in accordance with the invention, in block-schematic form. Reference numeral 6 designates a signal generator which provides a signal the frequency band of which extends between the frequencies 0 and $f_a$. The output signal from the signal generator 6 is supplied, through a terminal 1, to a first transmission channel which is indicated diagrammatically by a device I which has the property of completely rejecting all signal components having frequencies higher than $f_s$.

The output signal from the signal generator 6 is also supplied to a bandpass filter 7 having cut-off frequencies $f_s$ and $3f_s$. The output signal of the band-pass filter 7 is supplied to a modulator 9. This modulator 9 also has supplied to it a subcarrier produced by an oscillator 11 and having a frequency $f_1$ which is substantially equal to the centre frequency of the frequency band $2f_s$ under consideration.

The output signal of the band-pass filter 7 can be written:

$$\Sigma_p a_p \cos(\omega_p t+\vartheta_p)+\Sigma_q a_q \cos(\omega_q+\vartheta_q)$$

where $\omega_p=2\pi f_p$ and $f_p$ is a frequency lying between $f_s$ and $f_1$, and where $\omega_q=2\pi_q$ and $f_q$ is a frequency lying between $f_1$ and $3f_s$. The phase angles of the signals are represented by $\vartheta_p$ and $\vartheta_q$.

Hereinafter it will be proved that components in this signal the frequencies of which are equal to $f_1$ need not be considered.

The subcarrier supplied to the modulator 9 can be written $A\cos(\omega_1 t+\varphi)$ where $\omega_1=2\pi f_1$ and $\varphi$ is the subcarrier phase angle.

Hence, at the output of the modulator 9 a signal is produced:

$$\begin{aligned}&\Sigma_p \tfrac{1}{2} a_p A\cos((\omega_1-\omega_p)t-\vartheta_p+\varphi)+\\&\Sigma_p \tfrac{1}{2} a_p A\cos((\omega_1+\omega_p)t+\vartheta_p\varphi)+\\&\Sigma_q \tfrac{1}{2} a_q A\cos((\omega_q-\omega_1)t+\vartheta_q-\varphi)+\\&\Sigma_q \tfrac{1}{2} a_q A\cos((\omega_q+\omega^1)t+\vartheta_q+\varphi)\end{aligned}$$

to which may be added the subcarrier itself, the original signal and higher harmonics of the various components.

The output signal from the modulator 9 is supplied to an input terminal 2 of a transmission channel II. Since this transmission channel again has a frequency range between the frequencies 0 and $f_s$, the signal produced at the output terminal 2' of the transmission channel II is:

$$\Sigma_p \tfrac{1}{2}\alpha a_p A \cos((\omega_1-\omega_p)(t+\beta)-\theta_p+\phi)+ \Sigma_q \tfrac{1}{2}\alpha a_q A \cos((\omega_q-\omega_1)(t+\beta)+\theta_q-\phi)$$

where $\alpha$ and $\beta$ are constants which represent the damping and the phase shift respectively of the transmission channel.

The signal set up at the terminal 2' is supplied to a modulator 13.

This modulator 13 also has supplied to it a subcarrier having a frequency $f_1$ which is produced by an oscillator 15.

The subcarrier supplied to the modulator 13 can be written:

$$B \cos(\omega_1(t+\beta)+\psi)$$

where $\psi$ is the subcarrier phase angle.

In order to simplify the following explanation, a factor $t+\beta$ is substituted for the time factor $t$. It will be obvious that this does not detract from the universality of the expression of the subcarrier.

Consequently, at the output of the modulator 13 a signal is produced:

$$\Sigma_p \tfrac{1}{4}\alpha a_p AB \cos(\omega_p(t+\beta)+\theta_p-\phi+\psi)+ \Sigma_p \tfrac{1}{4}\alpha a_p AB \cos((2\omega_1-\omega_p)(t+\beta)-\theta_p+\phi+\psi)+ \Sigma_q \tfrac{1}{4}\alpha a_q AB \cos(\omega_q(t+\beta)+\theta_q-\phi+\psi)+ \Sigma_q \tfrac{1}{4}\alpha a_q AB \cos((2\omega_1-\omega_q)(t+\beta)-\theta_q+\phi+\psi)$$

to which may be added the signal itself which was supplied to the modulator, the subcarrier and higher harmonics of the various components.

Assuming the signal supplied to the modulator and so on to be set up actually at the output of the modulator 13, this output signal can be supplied to a bandpass filter 17 having a pass range between the frequencies $f_s$ and $3f_s$. At the output of this filter only a signal is produced as shown in the formula above.

The terms:

$$\Sigma_p \tfrac{1}{4}\alpha a_p AB \cos(\omega_p(t+\beta)+\theta_p-\phi+\psi)$$

and $$\Sigma_q \tfrac{1}{4}\alpha a_q AB \cos(\omega_q(t+\beta)+\theta_q-\phi+\psi)$$

are the desirable signal portions. The other signal portions are only inconvenient constituents in the output signal from the modulator 13.

According to the invention, the frequency $f_1$ is so chosen that it is equal to one fourth of an odd multiple of the frame frequency of the system. When this frame frequency is designated $f_b$ we have: $f_1=\tfrac{1}{4}(2k+1)f_b$, where $k$ is an integer.

The output signal of the modulator 13, which signal is shown in the formula, will now be considered for two successive frame periods. If it is further assumed that the television signal relates to a stationary object, we have:

$$\Sigma_p \tfrac{1}{4}\alpha a_p AB \cos(\omega_p(t+\beta)+\theta_p-\phi+\psi)= \Sigma_p \tfrac{1}{4}\alpha a_p AB \cos(\omega_p(t+\beta+T_b)+\theta_p-\phi+\psi)$$

where $T_b$ is a frame period of the television system and consequently $$T_b=\frac{1}{f_b}$$

From this, the fact which is known per se can be readily deduced that $f_p$ is a multiple of $f_b$: $f_p=mf_b$, where $m$ is an integer.

Obviously, we likewise have:

$$\Sigma_q \tfrac{1}{4}\alpha a_q AB \cos(\omega_q(t+\beta)+\theta_q-\phi+\psi)= \Sigma_q \tfrac{1}{4}\alpha a_q AB \cos(\omega_q(t+\beta+T_b)+\theta_q-\phi+\psi)$$

and consequently $f_q=nf_b$, where $n$ is an integer.

Strictly speaking, the relations $f_p=mf_b$, and $f_q=nf_b$ only hold if the television signal relates to a stationary object; if the frame frequency is not excessively small, these relations also hold, as a rough approximation, for moving objects.

From the fact that $f_1$ is chosen so that it is equal to one fourth of an odd multiple of the frame frequency $f_b$, it follows that in the television signal components having this frequency do not occur.

We will now consider the inconvenient constituents in the output signal of the modulator 13 for two successive frame periods. If for the first frame period the interference can be written:

$$\Sigma_p \tfrac{1}{4}\alpha_p AB \cos((2\omega_1-\omega_p)(t+\beta-\theta a_p+\phi+\psi) +\Sigma_q \tfrac{1}{4}\alpha_q AB \cos((2\omega_1-\omega_q)(t+\beta)-\theta a_q+\phi+\psi)$$

we have for the next subsequent frame period:

$$\Sigma_p \tfrac{1}{4}\alpha_p AB \cos((2\omega_1-\omega_p)(t+\beta+T_b)-\theta a_p+\phi+\psi) +\Sigma_q \tfrac{1}{4}\alpha_q AB \cos((2\omega_1-\omega_q)(t+\beta+T_b)-\theta a_q+\phi+\psi)$$

The latter expression can be written:

$$\Sigma_p \tfrac{1}{4}\alpha_p AB[\cos((2\omega_1-\omega_p)(t+\beta)-\theta a_p+\phi+\psi)\cos((2\omega_1-\omega_p)T_b)-\sin((2\omega_1-\omega_p)(t+\beta)-\theta_p+\phi+\psi)\sin((2\omega_1-\omega_p)T_b)] +\Sigma_q \tfrac{1}{4}\alpha_q AB[\cos((2\omega_1-\omega_q)(t+\beta)-\theta a_q+\phi+\psi)\cos((2\omega_1-\omega_q)T_b)-\sin((2\omega_1-\omega_q)(t+\beta)-\theta_q+\phi+\psi)\sin((2\omega_1-\omega_q)T_b)]$$

Since we have the relations $f_p-mf_b$ and, according to the invention, $f_1=\tfrac{1}{4}(2k+1)f_b$, $(2\omega_1-\omega_p)T_b$ is:

$$(2\omega_1-\omega_p)T_b=2\pi(k-m+\tfrac{1}{2})$$

and hence: $\cos((2\omega_1-\omega_p)T_b=-1$ and $$\sin((2\omega_1-\omega_p)T_b)=0$$

Likewise we have:

$$\cos((2\omega_1-\omega_q)T_b)=-1 \text{ and } \sin((2\omega_1-\omega_q)T_b)=0.$$

Thus, the two interfering terms during the next subsequent frame periods can be written:

$$-\Sigma_p \tfrac{1}{4}\alpha_p AB \cos((2\omega_1-\omega_p)(t+\beta)-\theta a_p+\phi+\psi) -\Sigma_q \tfrac{1}{4}\alpha_q AB \cos((2\omega_1-\omega_q)(t+\beta)-\theta a_q+\phi+\psi)$$

Owing to the said choice of the subcarrier frequency $f_1$, the disturbing components which occur in two successive frame periods are opposite to one another in polarity. Due to the integrating properties of the eye, the disturbances, which consequently compensate for each other in time, are hardly perceptible in the final image and on no account inconvenient.

It should be noted that when the number of lines from which the image is built up is an odd number, the frequency of the subcarrier is preferably made equal to one fourth of an odd multiple of the line frequency. Thus, the disturbing components show the least coarse structure in the image, so that the integrating action of the eye has to satisfy minimum requirements.

Since the original signal must be transmitted in correct phase relationship, the various desirable components must be subjected to a same time delay before they are supplied to the reproducing apparatus. This will be the case if: $\varphi-\psi=h\pi$ where $h$ is again an integer which may also be zero. Thus, the requirement is satisfied that the difference between the phase of the subcarrier supplied to the modulator 15 and the phase of the subcarrier as represented in the output signal of the transmission channel 2 is equal to a multiple of $\pi$ radians.

If this requirement is not fulfilled, the proper phase relationship can obviously be restored by means of suitable phase correction networks.

Similarly, the output signal from the signal generator 6 is supplied to the bandpass filter 8 which has a pass range between the frequencies $3f_s$ and $5f_s$. The output signal of the bandpass filter 8 is supplied to a modulator 10. This modulator 10 also has supplied to it a subcarrier provided by an oscillator 12 and having a frequency $f_2$, which is about equal to the centre frequency $4f_s$ of the frequency band under consideration.

The output signal from the modulator 10 is supplied to the input terminal 3 of the transmission channel III. The signal appearing at the output terminal 3′ of the transmission channel III is supplied to a modulator 14.

This modulator 14 also has supplied to it a subcarrier having a frequency $f_2$ and provided by an oscillator 16.

In order to suppress any undesirable components, the output signal from the modulator 14 can be supplied to a bandpass filter 18, which has a pass range between the frequencies $3f_s$ and $5f_s$.

The subcarrier supplied to the modulator 10 can be written:

$A' \cos(\omega_2 t + \varphi')$ and the subcarrier supplied to the modulator 14 can be written:

$$B' \cos(\omega_2(t+\beta)+\psi')$$

According to the invention, we now have:

$$f_2 = \tfrac{1}{4}(2k'+)f_b$$

where $k'$ is an integer.

The transmission will be in proper phase relationship without further expedients if:

$$\varphi' - \psi' = h'\pi$$

The output signals from the channel I, the bandpass filter 17 and the bandpass filter 18 are now combined in an addition device 22, if required after amplification by means of amplifiers 19, 20, and 21 respectively. Thus, at the output of this addition device 22 the original signal from the signal generator 6 is again produced. Although at the output of the addition device 22 disturbing components are also produced, their disturbing influence is substantially suppressed by the steps taken in accordance with the invention. The amplifiers 19, 20 and 21 can also be used, by a proper choice of their gain factors, to bring the said output signals at an equal level.

In addition, it must be ensured that the output signals from the amplifiers, 19, 20 and 21 are subjected to a same time delay and a same change of polarity. From the above, it will be evident that, if $h$ and $h'$ in the expressions:

$$\varphi - \psi = h\pi$$

and $$\varphi' - \psi' = h'\pi$$

are even numbers (including 0), no further steps are required to achieve the correct phase relationship of the entire transmitted signal and that, if $h$ and $h'$ are odd numbers, the output signal of the transmission channel I must change its polarity.

A comparison of the transmission system described with reference to Fig. 2 and the known systems shows that for the transmission of the signal portion between the frequencies $f_s$ and $f_a$ not only at the transmitter end but also at the receiver end the number of band-pass filters is reduced by half, for in the known systems four band-pass filters must be available at both ends, these filters having pass ranges between $f_s$ and $2f_s$, $2f_s$ and $3f_s$ and $4f_s$, $4f_s$ and $5f_s$, respectively. It will also be seen that the number of transmission channels, modulators and oscillators can be reduced by half, for in contradistinction to the known systems, in the system described with reference to Fig. 2, for a frequency range having a bandwidth which is twice the bandwith of a transmission channel use is made of one transmission channel together with the associated modulators and oscillators instead of two transmission channels with their modulators and oscillators.

In the system in accordance with the invention, the use of bandpass filters can, however, be entirely avoided.

The transmitter for the transmission system in accordance with the invention will now be considered first. If the modulator 9 is of the kind known pre se, in which the original signal is not produced at the output of the modulator, the band-pass filter 7 can be dispensed with.

The frequencies lying without the frequency range required to be transmitted, in the present example between $f_s$ and $3f_s$, may be represented by $af_s$, where $0<a<1$ and $3<a$. When modulating a subcarrier having a frequency $f_2$, these components at the output of the modulator produce components having frequencies $|f_2 \pm af_s|$. Since a transmission channel only transmits components having frequencies between 0 and $f_s$, the said components having frequencies $|f_2 \pm af_s|$ are not transmitted. If, now, the modulator is of the type which produces, at its output, the original signal also, frequencies $af_s$ also occur. The frequencies for which $0<a<1$ are also transmitted in this case; this can be prevented by connecting the bandpass filter 7 between the signal generator and the modulators. It will be appreciated that this is not required, if the modulator is of the kind in which the original signal is not set up at the output of the modulator. Such modulators are, for example, described in "Wave forms," published by McGraw-Hill Book Company Inc., 1949, chapter 11.

When the modulator 10 is also of this kind, the bandpass filter 8 can also be omitted.

Similarly, at the receiver end the use of band-pass filters can be avoided if the modulators 13 and 14 are of the kind in which at the output neither the input signal (in this example the signals produced at the output of transmission channels II and III respectively nor the associated sub-carrier is produced, provided also that no higher harmonics of the various components are produced at this output. Modulators which satisfy these requirements are also known from the passage quoted above.

Hereinbefore, it was assumed that the transmission channels have a frequency characteristic which shows a sharp boundary at the frequency $f_s$. Fig. 1 shows in broken lines the variation of a frequency characteristic for most practical cases. In this event, the frequencies $f_1$ and $f_2$ of the subcarriers, which are substantially equal to $2f_s$ and $4fs$ respectively, may be chosen so that $f_s$ is equal to the frequency at which the transmission factor of the transmission channel is reduced to half its value. Preferably the frequency characteristic of the transmission channels shows radial symmetry with respect to a point P (Fig. 1) in the proximity of this point. In this event, the various frequency ranges of the signal supplied by the signal generator 6, which are transmitted separately, correctly adjoin one another after being added by means of the addition device 22. Obviously, any bandpass filters which may be used must in this event also pass the frequencies $f_1 \pm f_t$ and $f_2 \pm f_t$, respectively. $f_t$ is the cut-off frequency of a transmission channel the frequency characteristic of which is shown by broken lines in Fig. 1.

If the frequency characteristic of a transmission channel originally does not show radial symmetry with respect to a point P as described hereinbefore, the frequency characteristic of a transmission channel can obviously be corrected by means of filter networks provided at the input or output of the channel so that this radial symmetry is achieved.

From the above it will be seen that the various frequency ranges which are transmitted separately must be carefully joined together at the transmitter and receiver ends. With reference to the case under consideration, in the known systems there are five different frequency ranges at the receiver which must be joined, whereas in the transmission system in accordance with the invention only three frequency ranges must be joined. Consequently, in the signal transmitted, the number of transition ranges which may give rise to disturbances are reduced and this obviously can only improve the quality of the signal transmitted.

Figure 3:
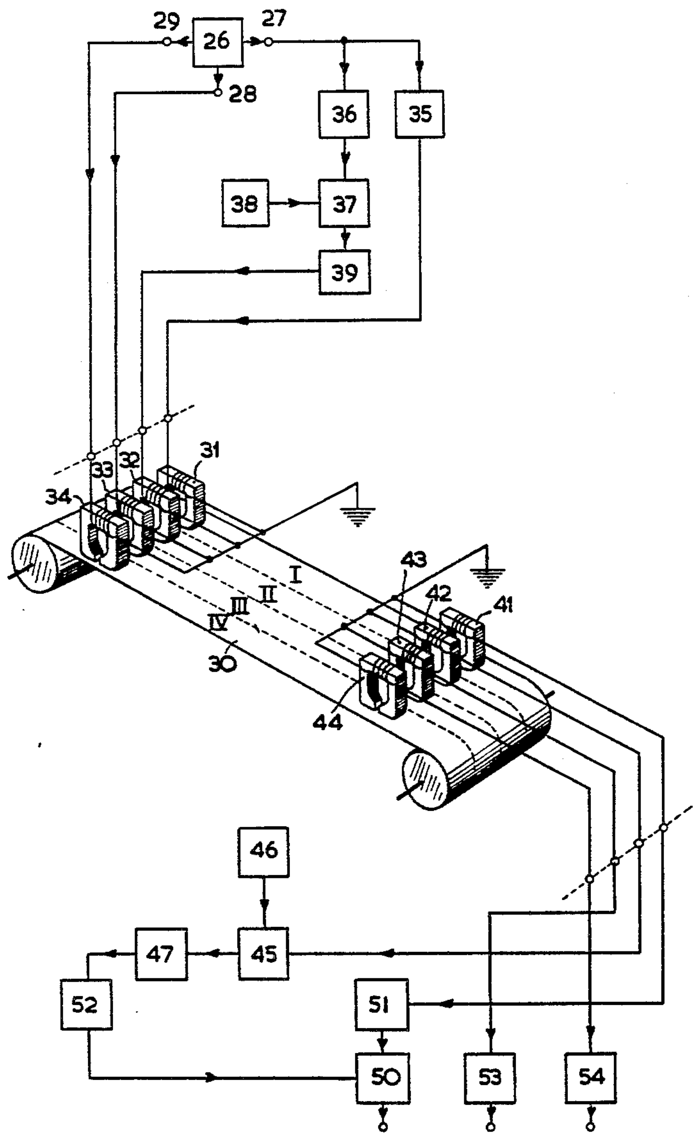

Fig. 3 shows a second embodiment of a transmitter and a receiver for a system in accordance with the invention, in block-schematic form. The transmitter comprises a magnetic recording system and the receiver comprises a magnetic reproducing system. In this example, the signal generator 26 is a colour television camera; at the output 27 of this camera, a brillance signal is produced having a bandwith of, say, 4.5 mc./s.; at outputs 28 and 29, signals are produced which each refer to the colour content of the scene to be displayed. Generally, the band-width of these signals only slightly exceeds 1.5 mc./s.; in most cases only one of the signals has such a bandwith, the other signal having a bandwidth of 0.5 mc./s.

It is assumed that the magnetic recording and/or reproducing system is capable of recording and reproducing signals having a frequency slightly exceeding 1.5 mc./s. The output signals from terminals 28 and 29 are supplied, if required after amplification, to magnetic recording heads 33 and 34 respectively, which record these signals in the tracks III and IV of a magnetic tape 30. The output signal from the terminal 27 is supplied to a low-pass filter 35 which reduces the bandwidth of this signal to a frequency of 1.5 mc./s. The output signal from this filter 35 is supplied to a magnetic recording head 31 which records this signal in the track I of the magnetic tape 30. The output signal from the terminal 27 is also supplied to a band pass filter 36 having a pass range between the frequencies 1.5 mc./s. and 4.5 mc./s. The output signal from this band pass filter is supplied to a modulator 37. This modulator 37 also has supplied to it a subcarrier having a frequency of about 3 mc./s. which is provided by an oscillator 38. The exact frequency of this subcarrier is again one fourth of an odd multiple of the frame frequency, or if the television image is built up from an odd number of lines, preferably one fourth of an odd multiple of the line frequency. The output signal from the modulator 37 is supplied, through a low-pass filter 39 which restricts the bandwith of the signal to a frequency of 1.5 mc./s., to a magnetic recording head 32 which records this signal in a track II of the magnetic tape 30.

If the signal, which thus has been recorded magnetically, is to be read out again, the magnetic tape 30 is passed along the air gaps of magnetic reproducing heads 41, 42, 43 and 44, in a manner such that the reproducing head 41 scans the track I and the reproducing head 44 scans the track IV. These reproducing heads form part of a magnetic reproducing system. The output signals from the reproducing heads 43 and 44 are supplied to amplifiers 53 and 54 respectively at the outputs of which the signals relating to the colour content of the scene to be displayed are set up. Similarly, the output signals from the reproducing head 41 is supplied to an amplifier 51.

The output signal from the reproducing head 42 is supplied to a modulator 45. This modulator 45 also has supplied to it a subcarrier which is provided by an oscillator 46 and has a frequency equal to the frequency of the subcarrier produced by the oscillator 38. In order to suppress any undesirable components, the output signal from this modulator 45 may be supplied to a band-pass filter 47 which has a pass range between the frequencies 1.5 mc./s. and 4.5 mc./s. The output signal from the bandfilter 47 is supplied to an amplifier 52. The output signals from the amplifiers 51 and 52 are finally added in an addition device 50 at the output of which the original brillance signal set up at the terminal 27 of the colour television camera 26 is recovered. This output signal also contains disturbing components, however, owing to the measures in accordance with the invention, the influence of these components in the image finally displayed is again substantially suppressed. Since we are concerned with the transmission of television signals, the system must also satisfy the requirements with respect to correct phase relationship of the transmission. This may be achieved without further expedients by making the difference between the phase of the subcarrier supplied by the oscillator 46 and the phase of the subcarrier supplied by the oscillator 38 as represented in the output signal of the reproducing head 42, equal to a multiple of $\pi$ radians.

Here also the amplifiers 51, 52, 53 and 54 may again be used, by a proper choice of their gain factors, to bring the output signals at the same level.

It will be appreciated that in this embodiment also a proper choice of the modulators 37 and 45 enables the band-pass filters 36 and 47 to be dispensed with.

It should also be noted that in view of the circumstance that generally one of the signals which relates to the colour content of the scene to be reproduced only has a bandwidth of 0.5 mc./s. whilst the available bandwidth of a transmission channel comprising a recording head, a track on the magnetic tape and a reproducing head is 1.5 mc./s., one of the transmission channels is not completely utilized. This circumstance can be used to advantage by utilizing the remaining frequency range, for example, for the transmission of a sound signal or for the transmission of a synchronizing signal for synchronizing the oscillators 38 and 46.

What is claimed is:

1. A system for the transmission of television or similar signals through one or more channels the bandwidth of which is smaller than the bandwidth of the signals comprising: a source of signals having a bandwidth substantially twice the bandwidth of a transmission channel, a first subcarrier oscillation generator generating a first subcarrier having a frequency which is one fourth of an odd multiple of the frame frequency of the system and also substantially equal to the center frequency of the frequency band of the source of signals, a first modulator to which is applied said signal source and said subcarrier for modulating the subcarrier with said signal source, the output signal from said first modulator being supplied to said transmission channel, and from said transmission channel to a second modulator, said second modulator being also supplied with a second subcarrier from a second oscillation generator having a frequency equal to that of said first subcarrier.

2. A system for the transmission of television or similar signals through one or more channels the bandwidth of which is smaller than the bandwidth of the signals comprising: a source of signals to be transmitted, a plurality of band-pass filters connected to said source of signals, each of said filters passing a band of frequencies substantially twice the bandwidth of a transmission channel, a first plurality of subcarrier oscillation generators each associated with a particular one of said band-pass filters for generating a subcarrier having a frequency which is one fourth of an odd multiple of the frame frequency of the system and also substantially equal to the center frequency of the frequency band passed by each filter, a first plurality of modulators each associated with a particular one of said band-pass filters, each modulator being supplied with the signals from an associated band-pass filter and a subcarrier oscillation generator, the output signal from each of said modulators being supplied to an associated transmission channel, a second plurality of modulators, the output from each transmission channel being supplied to an associated modulator, and a second plurality of subcarrier oscillation generators for supplying a subcarrier of the same frequency as said first subcarriers to each of said modulators.

3. A system for the transmission of television or similar signals through one or more channels the bandwidth of which is smaller than the bandwidth of the signals comprising: a source of signals to be transmitted, a plurality of bandpass filters connected to said source of signals, each of said filters passing a band of frequencies substantially twice the bandwidth of a transmission channel, a first plurality of modulators each associated with a particular one of said band-pass filters, each modulator being supplied with the signals from its associated band-pass filter, means for supplying each of said modulators with a subcarrier having a frequency which is one fourth of an odd multiple of the frame frequency of the system and also substantially equal to the center frequency of the frequency band passed by each filter, the output signal from each of said modulators being supplied to an associated transmission channel, a second plurality of modulators, the output from each transmission chanel being supplied to an associated modulator, and means for supplying said second plurality of modulators with subcarriers of the same frequency as said first subcarriers.

4. A system as claimed in claim 1, wherein the difference between the phase of the first subcarrier as represented in the output signal of the transmission channel and the phase of the second subcarrier is equal to a multiple of $\pi$ radians.

5. A system as claimed in claim 3, wherein the difference between the phase of the first subcarrier as represented in the output signal of the transmission channel and the phase of the second subcarrier is equal to a multiple of $\pi$ radians.

6. A system for the transmission of television or similar signals through one or more channels the bandwidth of which is smaller than the bandwidth of the signals comprising: a source of signals to be transmitted, a first plurality of modulators, each modulator having the property that the signal supplied to its input does not appear at its output, each modulator being supplied with signals from the source, means for supplying each modulator with a subcarrier having a frequency which is one fourth of an odd multiple of the frame frequency of the system and substantially equal to the center frequency of the frequency band under consideration, the output signal from each of said modulators being supplied to an associated transmission channel, a second plurality of modulators having the same property as the first plurality, the output from each transmission channel being supplied to an associated modulator, and means for supplying said second modulators with subcarriers of the same frequency as said first subcarriers.

7. A system as claimed in claim 1, wherein said transmission channel comprises a magnetic recording head, a magnetic tape and a magnetic reproducing system.

8. A system as claimed in claim 3, wherein said transmission channel comprises a magnetic recording head, a magnetic tape and a magnetic reproducing system.

9. A transmitter for a television transmission system comprising a source of signals, the frequency of which lies within a frequency band of the signal to be transmitted and being substantially twice the frequency range of a transmission channel, a modulator, a subcarrier oscillation generator, means for applying said source and said subcarrier to said modulator, said subcarrier having a frequency which is substantially equal to one fourth of an odd multiple of the system frame frequency and also substantially equal to the center frequency of the frequency band under consideration, the output signal from the modulator being supplied to a transmission channel.

10. A transmitter as claimed in claim 9, wherein a filter is interposed between the source of signals and said modulator.

11. A transmitter as claimed in claim 9, wherein said modulator has the property that the signal supplied to it does not appear at its output.

12. A receiver for a television transmission system comprising a transmission channel through which is transmitted a subcarrier modulated by a signal, a modulator to which is supplied the output signal of the transmission channel, and a subcarrier oscillation generator for supplying a subcarrier to said modulator, said subcarrier having a frequency which is equal to the frequency of the subcarrier present in the output signal of the transmission channel.

13. A receiver as claimed in claim 12, wherein the difference between the phase of the subcarrier as represented in the output signal of the transmission channel and the phase of the subcarrier generated in the receiver is equal to a multiple of $\pi$ radians.

14. A receiver as claimed in claim 12, the output signal from the modulator being supplied to a band-pass filter having a pass-band limited to the frequency band under consideration.

15. A receiver as claimed in claim 12, wherein said modulators has the property that its output contains neither the signal nor the subcarrier supplied to its input.

References Cited in the file of this patent

UNITED STATES PATENTS

| | | |
|---|---|---|
| 2,035,545 | Green | Mar. 31, 1936 |
| 2,769,856 | Artzt | Nov. 6, 1956 |
| 2,818,464 | Sziklai | Dec. 31, 1957 |